INVENTORS.
Casimer J. Borkowski
BY Manfred K. Kopp

ATTORNEY.

United States Patent Office 3,517,194
Patented June 23, 1970

3,517,194
POSITION-SENSITIVE RADIATION DETECTOR
Casimer J. Borkowski and Manfred K. Kopp, Oak Ridge, Tenn., assignors to the United States of America as represented by the United States Atomic Energy Commission
Filed Oct. 24, 1968, Ser. No. 770,220
Int. Cl. H01j 39/04
U.S. Cl. 250—83.6
5 Claims

ABSTRACT OF THE DISCLOSURE

An improved position-sensitive detector is provided by placing a timing reference electrode in the detector element together with a high resistance collector electrode. The high resistance collector electrode provides a pulse whose rise time is indicative of the impact position of a radiation event along the collector. The addition of the time reference electrode provides a reference pulse having a constant rise time independent of the impact position. Thus, by time comparison of the position independent reference pulse with the position dependent pulse the radiation impact position is determined with greatly increased spatial resolution and improved linearity.

BACKGROUND OF THE INVENTION

This invention was made during the course of, or under, a contract with the U.S. Atomic Energy Commission.

This invention relates to a position-sensitive radiation detector in which the collector is made highly resistive and more specifically to an improved position-sensitive detector of the highly resistive collector type in which a time reference electrode is positioned in the detector together with the resistive collector.

The present invention is an improvement of the position-sensitive radiation detector disclosed in our copending application S.N. 680,428, filed Nov. 3, 1967, issued as Pat. No. 3,483,377 on Dec. 9, 1969, and assigned to the assignee of the present invention and incorporated herein by reference thereto.

According to the copending application a new type of position-sensitive radiation detector is disclosed wherein the rise time of the output pulse from a highly resistive collector is used as a measure of the impact position of an ionizing event within the detector. The output of the collector is connected to a voltage-sensitive preamplifier which applies the collector output signal simultaneously to a fast and slow double RC differentiator network to provide a pair of multipolar pulses which feed corresponding crossover timing circuits to determine the rise time of the collector pulse and thus the position of the ionizing event along the collector.

It has been found that the operation of this type of position-sensitive detector is improved by placing a time reference generating pickup electrode in the detector. The signal therefrom, after amplification, is used as the former "fast channel" signal and results in more position independent spatial resolution and a high degree of linearity.

SUMMARY OF THE INVENTION

In accordance with the present invention it is therefore an object of this invention to provide an improved position-sensitive radiation detector of the high resistance collector type by introducing an auxiliary pickup electrode into the detector counter in close parallel relation with the highly resistive collector so as to provide a fast, position-independent reference timing signal. The auxiliary pickup provides a signal which is position-independent and, therefore, has the same rise time independent of the position of impact of the detected radiation. Thus, a standardized reference timing signal is provided for comparison with the position dependent pulse from the resistive collector and thereby greatly improves the linearity and spatial resolution of the detector.

DETAILED DESCRIPTION

Figure 1:
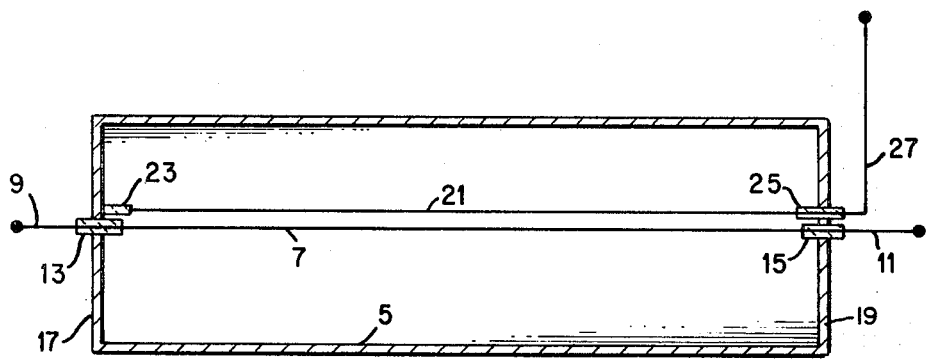
FIG. 1 is a longitudinal cross sectional view of a gas-filled counter embodying the improvement of the present invention.

The construction of the improved detector is illustrated, for example, by a proportional counter in FIG. 1. The improvement of the present invention is, as in the case of the above-referenced copending application, applicable to many detectors, including both gas and semiconductor types.

As pointed out in the copending application, a charge is placed upon the collector whenever an ionizing event takes place within the sensitive region. In a gas-filled detector tube, or proportional counter, this charge is placed upon the central collector wire or collecting electrode at a point closest to the position of the ionizing event in the surrounding gas. Ordinarily, this creates an output pulse that only indicates that there was an ionizing event, but does not specify the position. However, when the collector wire is made to have a very high resistance the rise time of any output pulse is affected by the position of the ionizing event along the wire. The rise time is not a function of the charge placed upon the wire, but depends on the wire resistance and distributed capacitance between the position of the event and the output of the collector wire.

According to the present invention, as shown in FIG. 1, a cylindrical electrically conductive housing 5 encloses a high resistance collector 7 positioned along the axis of the housing. Electrical leads 9, 11 connected to the collector 7 pass through insulators 13, 15 in the ends 17, 19, respectively, of housing 5. A conductive pickup electrode 21 is positioned parallel and in close proximity to the collector 7. One end of this electrode is supported from end plate 17 by means of an insulator 23 and the other end extends through an insulator 25 in end plate 19 to an external lead 27.

Figure 2:
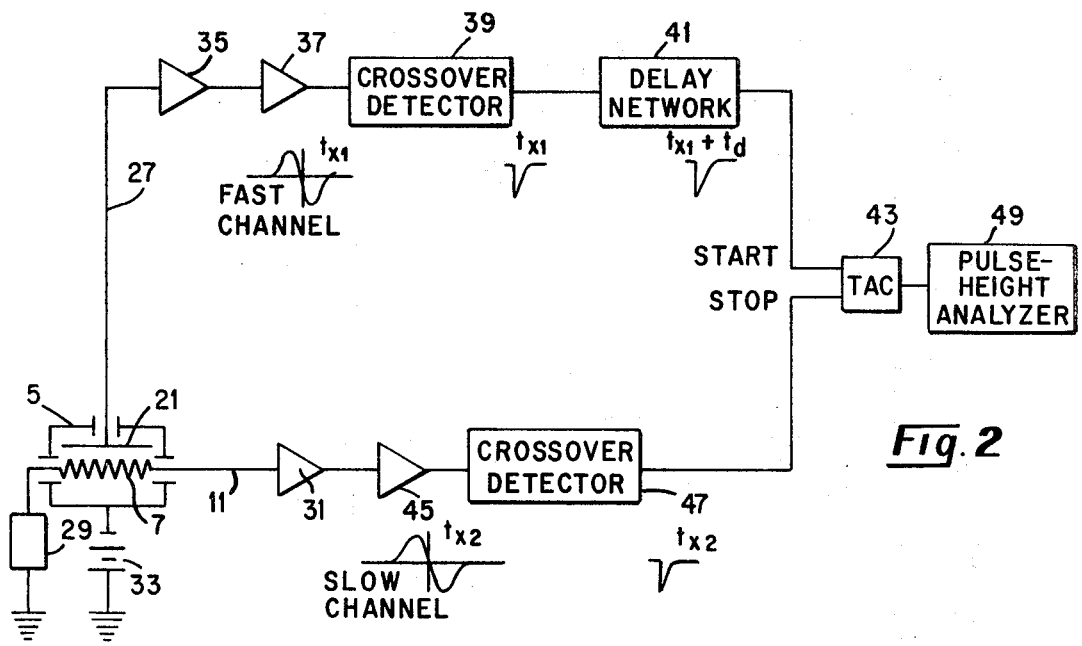
FIG. 2 is a schematic diagram of the improved position-sensitive radiation detector according to the present invention.

A schematic diagram of the improved detector system is shown in FIG. 2. As shown, one end of collector 7 is connected by means of lead 9 to a terminating impedance 29 which is an approximation to the characteristic impedance of the detector considered as an infinite RC line. Lead 11 connects the collector 7 to a preamplifier 31. The housing 5 of the detector is connected to the negative side of a high voltage supply 33 which has its positive side connected to ground potential. The pickup electrode 21 is connected by means of lead 27 to the input of a preamplifier 35 which begins the series connection of a fast channel network similar to the fast channel of the copending application. The fast channel includes preamplifier 35 having its output connected to a fast amplifier 37 which includes two RC differentiators and one RC integrator with identical time constants. The output of amplifier 37 is a bipolar pulse having a crossover time $t_{x1}$ as shown in FIG. 1. This crossover time is detected by a crossover detector 39 which provides a negative going pulse at its output at the crossover time $t_{x1}$. Pulse $t_{x1}$ is delayed a time $t_d$ in a delay network 41.

of particles or radiation. Several detectors were constructed with pickup electrodes to compare their operation with an otherwise standard position-sensitive detector. The results obtained with these detectors can be readily compared by referring to Table I in which detectors 1 and 6 indicate the pickup electrode.

TABLE I

|  | Detector No. | | | | | |
| --- | --- | --- | --- | --- | --- | --- |
|  | 1 | 2 | 3 | 4 | 5 | 6 |
| Radiation or particle type [1] | X-rays | X-rays | Neutrons | Neutrons | Alpha | Alpha |
| Gas filling | Kr-CH$_4$ | Kr-CH$_4$ | BF$_3$ | BF$_3$ | A-CH$_4$ | A-CH$_4$ |
| Gas pressure, cm. Hg | 152 | 152 | 76 | 152 | flow | flow |
| Sensitive length, mm | 400 | 400 | 400 | 400 | 250 | 40 |
| Collector resistance, kΩ/mm | 40 | 40 | 8 | 8 | 8 | 400 |
| Collector capacitance, farad/mm×10$^{-15}$ | 8.5 | 8.5 | 8.5 | 8.5 | 8.5 | 32 |
| Detector geometry | ([2]) | ([2]) | ([2]) | ([2]) | ([2]) | ([3]) |
| RC differentiator time constants: | | | | | | |
| Main amplifier, μsec | 6.4 | 6.4 | 12.8 | 12.8 | 6.4 | 6.4 |
| Fast amplifier, μsec | ([4]) | 1 | 2 | 2 | 2 | ([4]) |
| Experimental results: | | | | | | |
| Position sensitivity, nsec./mm | 34 | 18 | 25 | 25 | 18 | 310 |
| Spatial resolution,[5] mm. (FWHM) | 0.5 | 1.15 | 10.5 | 6.2 | 0.66 | 1.25 |

[1] Detectors 1 to 5 are proportional counters and No. 6 is a pulse-ion chamber.
[2] Cylinder.
[3] Parallel plates at 40 mm distance.
[4] The pickup electrode was used in the fast amplifier channel.
[5] At the center position. (The collimator diameters were: 0.1 mm. for the X-ray source, 0.3 mm. for the alpha source, and 1.5 mm for the thermal-neutron beam.)

The output of delay network 41 is connected to the start input of a time-to-amplitude converter 43 (TAC). The reference signal originates the delayed start pulse for the TAC 43. The stop pulse for the TAC is obtained through the slow channel connected to the collector wire 7 and consists of preamplifier 31 having its output connected to the input of a main amplifier 45. Amplifier 45 contains two series connected double RC differentiators to transform the preamplifier output pulse into a bipolar pulse having a cross over time $t_{x2}$ which varies depending upon the rise time of the collector pulse. The output of amplifier 45 is connected to a crossover detector 47 which provides a negative going output pulse at time $t_{x2}$. This pulse is applied to the "stop" input of TAC 43. The output of the time-to-amplitude converter 43 is connected to a pulse-height analyzer 49 in which the pulse is registered and stored for subsequent analysis.

If it is desirable to have the output of the circuit in digital form, the TAC 43 and converter 49 can be replaced by a gated clock oscillator (not shown). The gated clock converts the position dependent time interval between the delayed start and stop pulses directly into a digital address for a multichannel memory.

The operation of the circuit is similar to that described in the above-referenced copending application. The signals in both the fast and slow channels are bipolar and their zero crossing points are determined to give a precise time to start and stop the TAC 43. The improvement in operation, which will be readily obvious from subsequent discussions of experimental data, is brought about by providing a highly position-independent reference timing signal. The pickup electrode 21 which is positioned parallel to the resistive collector provides a pulse during each ionizing event which consists of the sum of three components of collected charge: (1) a portion of the center-wire charge transmitted by the capacitance between the collector wire and the pickup wire 21, (2) a charge induced by ions moving toward the pickup wire, and (3) a charge induced by ions moving away from the pickup wire. The rise time of the pickup output pulse is constant and is independent of the position of the ionizing event. Thus, it can be seen that a standardized reference timing pulse is provided which is independent of possible nonlinearity in the rise time of pulses from the collector electrode are not compounded as in the previous circuit which used the collector output pulse to generate both the reference and main timing pulse.

EXPERIMENTAL RESULTS

The system was tested for spatial resolution and linearity by use of the detectors of Table I for different types The proportional counters for X-ray and neutron detection (Nos. 1–4) were built from 500-mm. long, 15-mm. diameter beryllium cylinders. Counter No. 5 was built from a 300-mm. long, 19-mm. diameter cylinder. The collectors of all proportional counters (Nos. 1–5) were made from commercially available quartz fiber with pyrolytic carbon coating. The collectors for the two X-ray counters had a resistivity of 40K ohms/mm. and a diameter of 0.01 mm. The collectors for the alpha and neutron counters (Nos. 3–5) had a resistivity of 8K ohms/mm. and a diameter of 0.025 mm. The collector of the pulse ion chamber (No. 6) was made by evaporating a carbon film on a glass substrate. The film resistivity was 1.6 megohms per square, and the collector was 40-mm. long and 4-mm. wide. The pickup electrode, when used, was a 0.25 mm. diameter nickel wire placed 1.5 mm. from and parallel to the opposite collector. The potential at the pickup electrode was adjusted to obtain negligible distortion of the collector field.

Figure 3:
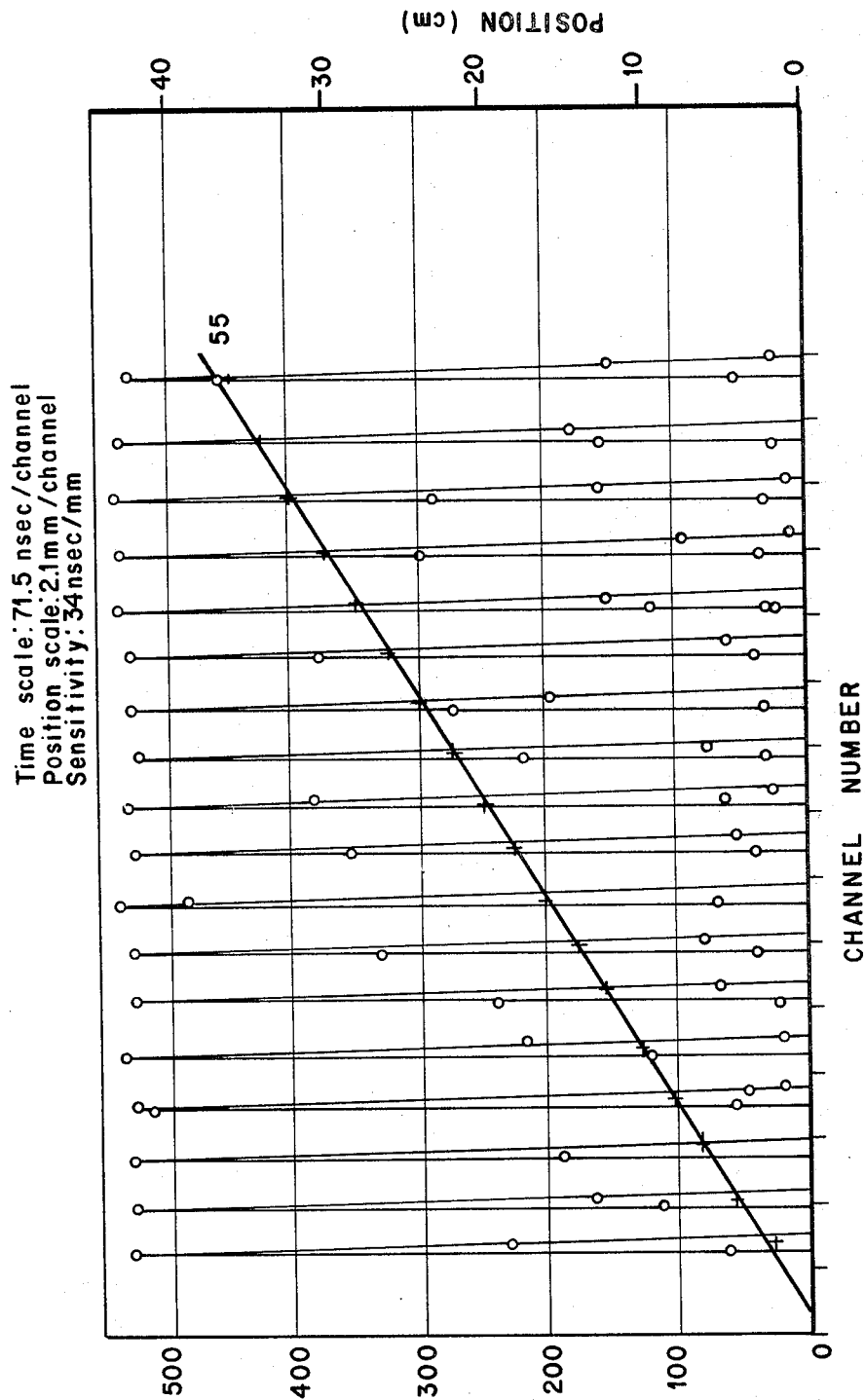
FIG. 3 is a graph of a linearity test of a detector according to the present invention, using pickup electrode timing.
Figure 4:
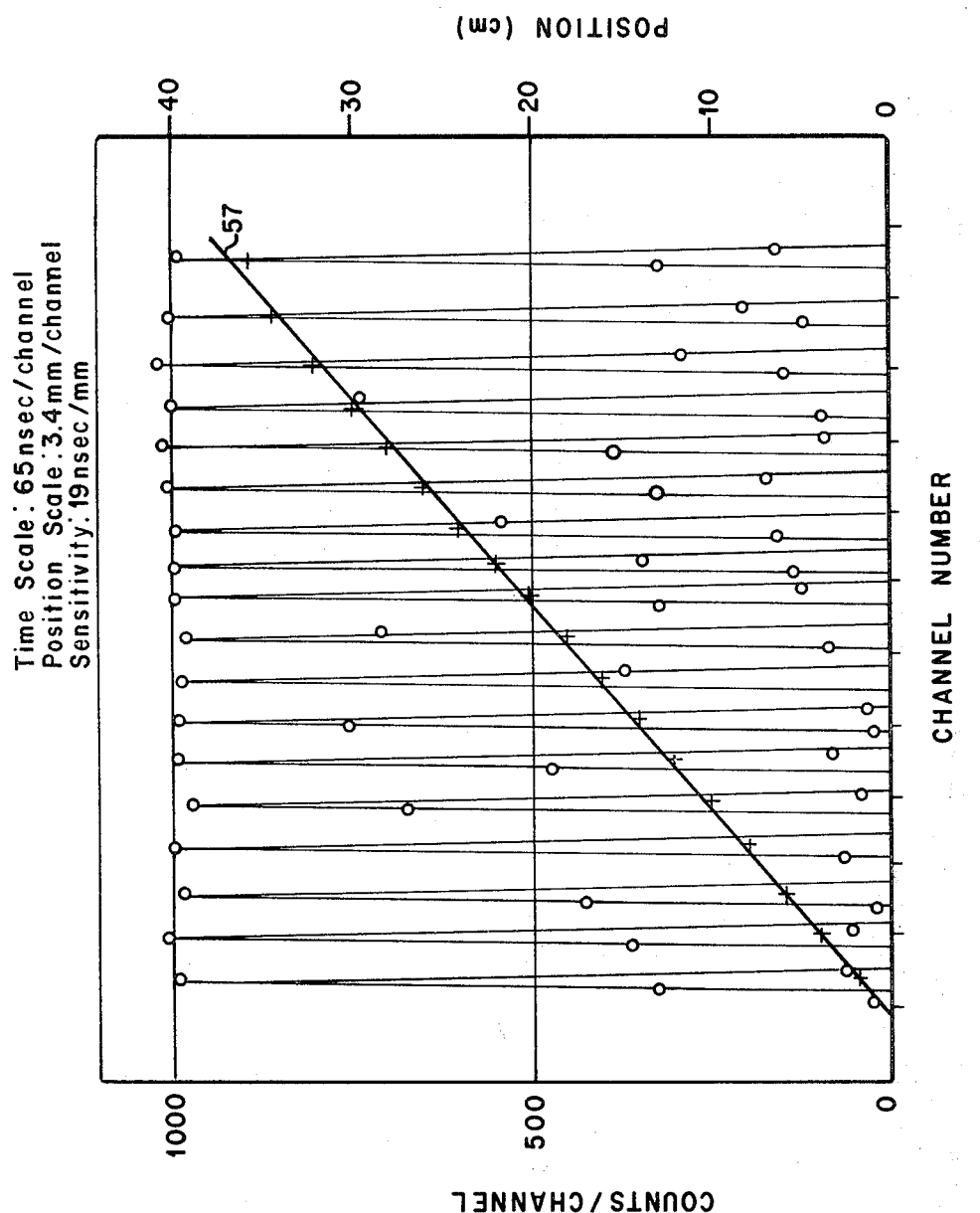
FIG. 4 is a graph shown for comparison with FIG. 3 of a linearity test on a detector without pickup electrode timing.

The results for detectors Nos. 1 and 2 are most easily compared because of the detector similarity. As can be seen in Table I, detector No. 1 had a pickup electrode and exhibited a much higher position sensitivity and a greatly improved spatial resolution. The linearity of the two detectors is compared in FIG. 3 and FIG. 4, with the superiority of detector No. 1 (using a pickup electrode) evident in FIG. 3. As shown in the graph of FIG. 3, the linearity as depicted by line 55 drawn through the data points indicating the position of the X-ray source (right hand scale) plotted against channel number is extremely close as compared to line 57 of FIG. 4 for the detector without a pickup electrode.

Thus, it will be seen that a greatly improved position-sensitive radiation detector has been provided which has greatly improved spatial resolution and position linearity.

Figure 5:
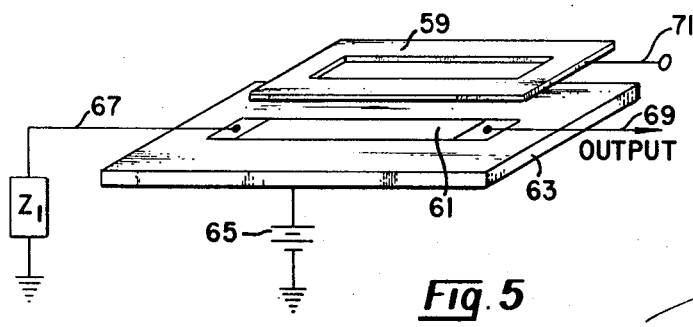
FIG. 5 is an exploded view of a surface barrier semiconductor detector modified according to the present invention.

Although the invention has been described with reference primarily to gas-filled counter tubes, it is equally applicable to semiconductor detectors as well. For example, as shown in FIG. 5, a position-sensitive surface barrier semiconductor detector has been modified by placing a stainless steel plate 59 close to the resistive collector surface 61 to substantially improve the linearity and spatial resolution. The detector body consists of an elongated silicon block 63 upon which the resistive collector surface 61 is deposited. The collector surface can be either a palladium or carbon vapor deposited film which provides the necessary resistance for proper operation. The stainless steel plate 59 serves as a pickup electrode and is positioned on the block 63 surrounding collector 61. The detector is biased by means of a D.C. voltage supply 65 having the negative side connected to ground potential and the positive side connected to block 63 by means of an ohmic contact, not shown. The collector 61 is connected on the one end to a termination impedance $Z_1$ by means of lead 67 and on the other end to amplifier 31 by means of lead 69. The pickup electrode 59 (FIG. 1) is connected to amplifier 35 by means of lead 71.

It will be obvious to those skilled in the art to make other modifications and changes within the spirit and scope of the present invention. Therefore, the scope of the invention will be considered limited only by the following claims.

What is claimed is:

1. In a position-sensitive radiation detector including an ionizing radiation detecting element having a high resistance collector so that a pulse at the output thereof has a rise time proportional to the position of an ionizing event along said collector, the improvement comprising: a pickup electrode disposed in said detecting element, said electrode providing a time reference signal whose rise time is independent of the position of said ionizing event; a first channel connected to said pickup electrode for sensing the rise time of said reference signal and providing an output pulse indicative of the beginning of a rise time measurement; a second channel connected to said collector for sensing the rise time of said position-dependent pulse from said collector and providing an output pulse indicative of the end of a rise time measurement from said collector; and means having a first and second input connected to said first and second channel outputs, respectively, for measuring the time between a pulse applied to said first input thereof and a pulse applied to said second input thereof.

2. An improved position-sensitive radiation detector as set forth in claim 1 wherein said pickup electrode comprises an electrically conductive element insulatably mounted within said detector element in close parallel relationship to said collector.

3. An improved position-sensitive radiation detector as set forth in claim 2 wherein said radiation detector element is a gas-filled detector tube having a highly resistive collector wire and said pickup electrode is a highly conductive wire co-extensive with the length of said collector wire.

4. An improved position-sensitive radiation detector as set forth in claim 3 where said pickup wire is made of nickel.

5. An improved position-sensitive radiation detector as set forth in claim 1 wherein said radiation detector element is a surface barrier semiconductor detector having a thin highly resistive collector surface deposited on one side thereof, a highly conducting pickup electrode disposed on the surface of said semiconductor body spaced from and surrounding said collector, and bias means connected between the opposite surface of said semiconductor body and ground potential.

References Cited

UNITED STATES PATENTS

| 2,551,576 | 5/1951 | Bailey | 250—83.6 |
| 3,207,902 | 9/1965 | Sandborg | 250—83.3 |
| 3,415,992 | 12/1968 | Webb | 250—83.3 X |

RALPH G. NILSON, Primary Examiner

D. L. WILLIS, Assistant Examiner

U.S. Cl. X.R.

313—93